Oct. 11, 1932.  C. E. WELLMAN  1,882,351
BRAKE ROD SUPPORT
Filed Sept. 30, 1931  2 Sheets-Sheet 1
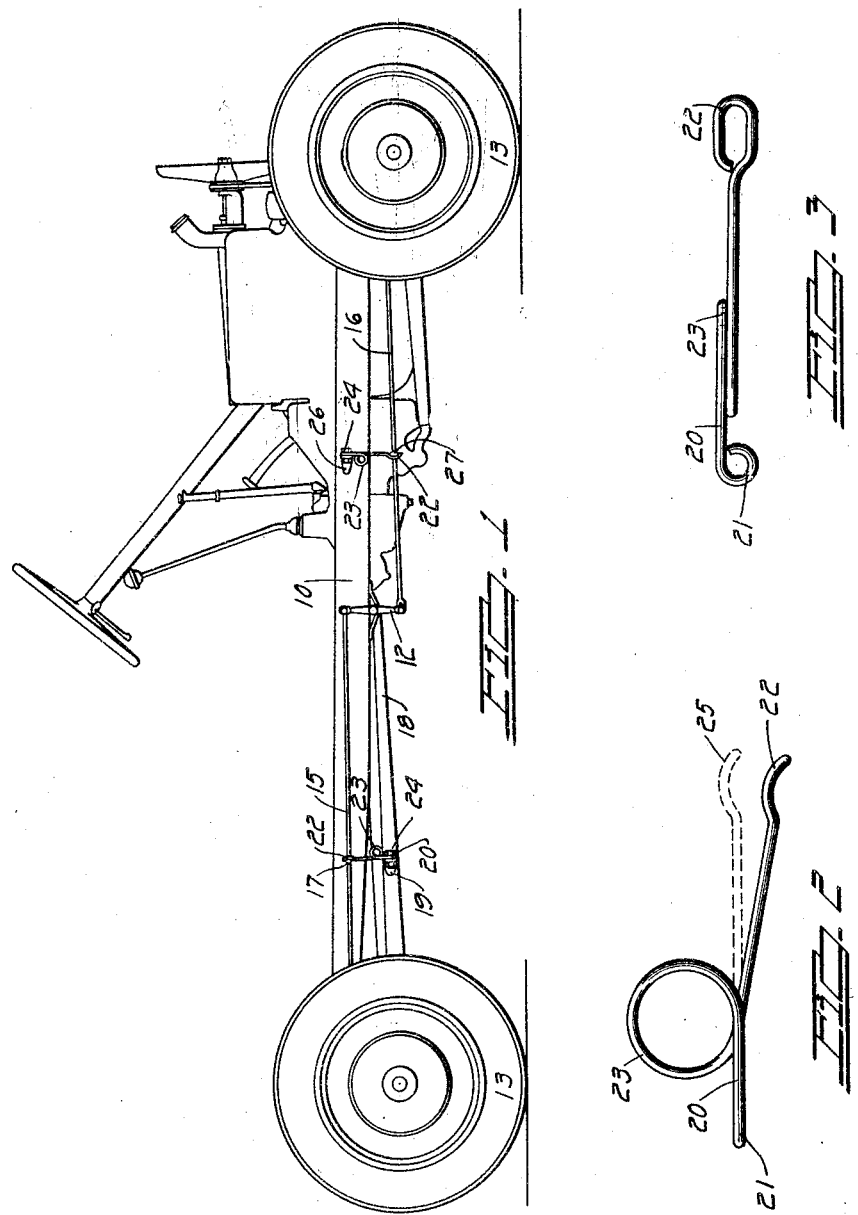
INVENTOR.
C. E. Wellman.
BY
ATTORNEY.

Oct. 11, 1932.   C. E. WELLMAN   1,882,351
BRAKE ROD SUPPORT
Filed Sept. 30, 1931   2 Sheets-Sheet 2
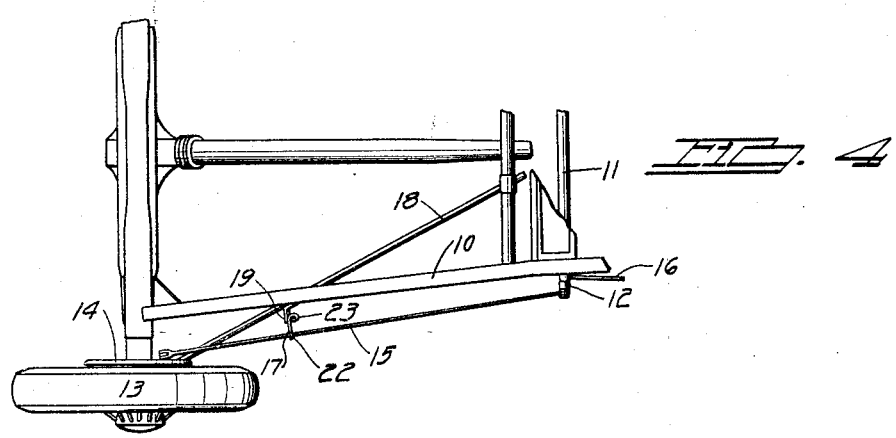
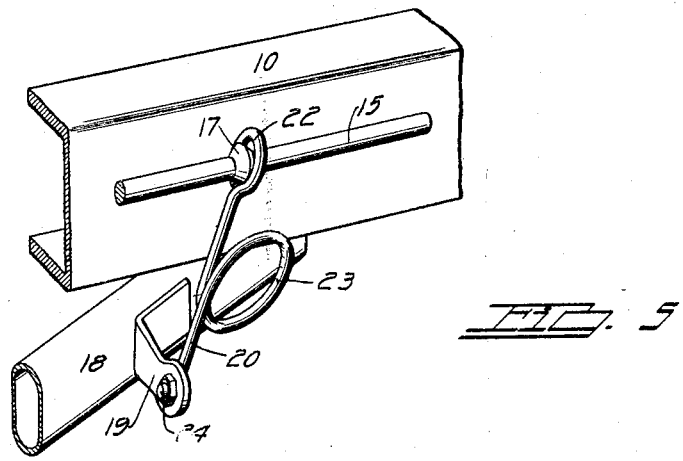
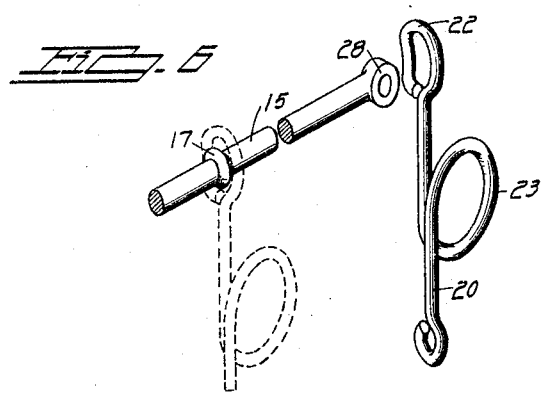
INVENTOR.
C. E. Wellman.
BY
ATTORNEY.

Patented Oct. 11, 1932

1,882,351

UNITED STATES PATENT OFFICE

CHARLES E. WELLMAN, OF DEARBORN, MICHIGAN, ASSIGNOR TO FORD MOTOR COMPANY, OF DEARBORN, MICHIGAN, A CORPORATION OF DELAWARE

BRAKE ROD SUPPORT

Application filed September 30, 1931. Serial No. 566,056.

The object of my invention is to provide an automobile brake of simple, durable and inexpensive construction.

More specifically, the object of my invention is to provide a simple and inexpensive means for returning the brake operating rods associated with an automobile to their inoperative positions. This device is particularly adapted for use on vehicles having a pair of longitudinally extending brake rods on each side of the frame, one rod extending from each wheel to the center of the vehicle where a cross shaft having T ends operatively connects the four rods so that rotation of the cross shaft simultaneously draws all of the rods toward the center to thus apply the brakes. It is, of course, necessary that these rods be returned to their inoperative positions when the brakes are released and it is further very desirable to resiliently support the center portion of each of these rods in order that whipping, due to vibration and road shocks, may be eliminated. The structure which is the subject of this application consists of a resilient wire bent to such shape that the intermediate portions of each of these brake operating rods are not only supported but also resiliently urged to their inoperative positions. The device being constructed from spring wire resiliently supports the rods so that side sway of the car relative to the axles cannot apply the brakes.

With these and other objects in view, my invention consists in the arrangement, construction and combination of the various parts of my improved device, as described in the specification, claimed in my claims and illustrated in the accompanying drawings, in which:

Figure 1 shows a side view of an automobile chassis having my improved brake installed thereon.

Figure 2 shows a plan view of my brake rod spring.

Figure 3 shows a side view of the spring, shown in Figure 2.

Figure 4 shows a plan view of one rear corner of a chassis, illustrating the installed position of the rear brake spring.

Figure 5 shows a perspective view of the brake spring, shown in Figure 4, and

Figure 6 shows a perspective view of my brake rod and spring illustrating how the spring is assembled on the brake rod.

Referring to the accompanying drawings, I have used the reference numeral 10 to indicate generally the chassis frame of a vehicle. A brake cross shaft 11 is rotatably mounted to this frame and extends across beneath the intermediate portion thereof. This shaft is provided with a pair of beams 12 fixedly secured to the outer ends thereof whereby oscillation of the cross shaft actuates each of these beam members. Each of four wheels 13 of the vehicle is provided with internal expanding brakes 14 which are applied by the actuation of suitable brake operating levers. The free end of each lever associated with the rear brakes is pivotally connected to one of the rear brake operating rods 15 which extends from the rear wheels up to the top ends of the beams 12, each rod extending substantially parallel to the frame 10. In like manner a pair of front brake actuating rods 16 extend from the front wheels rearwardly to the lower ends of the beams 12. Each of these four rods must necessarily be from four to five feet long and inasmuch as they are subject only to a tension stress are made of relatively small cross section rod. These rods are therefore subject to vibration, due to shocks which cause an annoying rattle when the car is traveling on rough roads.

The device which I have provided for eliminating this vibration consists of inexpensive springs which are attached to the vehicle and rods to resiliently support the center portion of each of these rods. An annular flange 17 is upset on the intermediate portion of each rod 15. This point is adjacent to the intersection of a radius rod 18 and the frame 10, which radius rods extend from the outer ends of the rear axle to the center portion of the frame. An L-shaped bracket 19 is secured on each radius rod with one arm thereof projecting outwardly, which arm has an opening therein whereby my brake rod retracting spring may be secured thereto.

This retracting spring consists of a spring steel wire 20 having one end bent back upon itself to form a circular eye 21 while the other end is bent back upon itself to form elongated eye 22, the intermediate portion of the wire 20 being bent through a single relatively large convolution 23. As will be noted from Figure 2, the plane of the eye 22 is an arcuate shape whereby a better contact with the upset portion 17 results. The purpose of this eye being elongated is so that the device may be assembled. As will be noted from Figure 6, the rods 15 and 16 are provided with integral clevis pin retaining heads 28. The elongated eyes 22 are proportioned so that these heads may extend therethrough, but will still be stopped by the upset portions 17.

The eye 21 is assembled to the bracket 19 by means of a bolt 24 with the wire projecting upwardly so that the rod 17 may be threaded through the elongated eye 22 as above described. When the device is installed and the brakes are in their inoperative position, the spring assumes the position, shown by the dotted lines 25 in Figure 2, so that these rods are resiliently urged to their inoperative positions by the tension in the convolution 23. When the cross shaft 11 is actuated, the spring is still further stressed so that under all conditions the intermediate portion of the rod 15 is resiliently supported and further, the play between the ends of the rods and the beams is taken up. The intermediate portion of two front brake operating rods 16 are likewise supported by springs identical to the springs 20, the only difference in installation being that the bracket 26 is secured to the side of the frame member 10 with the eye 21 secured therein. The eye 22 extends downwardly and coacts with an upset portion 27 formed on a certain portion of the rod 16.

During the normal operation of my improved brake, both pairs of rods 15 and 16 are resiliently urged to their inoperative positions, thereby causing the brake pedal to also return to its inoperative position. This is accomplished without excessive spring pressure being applied through the brake shoes and shoe operating mechanism.

Among the many advantages arising from the use of my improved device, it may be well to mention that my brake spring is very inexpensive to manufacture for the reason that it can be completely formed by an automatic spring forming machine and that no subsequent machine work is required on the device.

A further advantage results in that the brake operating rods are resiliently secured against both vertical and lateral movement. The advantage of resiliently holding the rods against lateral displacement cannot be too highly emphasized inasmuch as a rigid support against lateral movement is liable to engage the brakes when the latter are closely adjusted and the vehicle is swayed sidewise in rounding a corner. Under these conditions the axle of the car shifts laterally relative to the frame and unless resiliently supported bending of the rods result which may apply the brakes. With this device a lateral shifting of the car simply flexes the springs laterally to compensate for the new positions assumed by the rods.

Some changes may be made in the arrangement, construction and combination of the various parts of my improved device without departing from the spirit of my invention, and it is my intention to cover by my claims such changes as may reasonably be included within the scope thereof.

I claim as my invention:

1. In a device of the character described, a resilient wire having one end bent back upon itself to form an eye, said eye being suitable to coact with an upset ring formed on a brake rod, said wire having a second eye formed on the opposite end thereof whereby it may be secured in position, and the center portion of said wire being bent through a relatively large convolution for the purpose described.

2. In a device of the character described, a resilient wire having one end bent back upon itself to form an elongated eye especially adapted to coact with an annular upset portion of a brake rod, said wire having a second eye formed on the opposite end thereof whereby it may be secured in position, and having its center portion bent through a relatively large convolution for the purpose described.

3. In a device of the character described, a resilient wire having one end bent back upon itself to form an elongated eye especially adapted to coact with an annular upset ring formed on a brake rod, said eye being formed with a curved surface to better coact with said annular upset ring, said wire having a second eye formed on the opposite end thereof whereby it may be secured in position, and having its center portion bent through a relatively large convolution for the purpose described.

CHARLES E. WELLMAN.